Patented Aug. 30, 1927.

1,641,066

UNITED STATES PATENT OFFICE.

JOSEPH D. CAMPANO, OF BERKELEY HEIGHTS, NEW JERSEY.

MIXTURE FOR STOPPING LEAKS.

No Drawing.  Application filed June 17, 1926.  Serial No. 116,724.

The present invention is concerned with the provision of a mixture which may be poured into the radiator of an automotive vehicle, and which will crystallize around any openings in the radiator to effectively stop leaks through the openings.

Solutions for performing the same general purpose are at present on the market, but their effectiveness is very temporary, and they are merely used to stop a leak until such time as the car may be taken to a repair shop. The solutions which are at present in use are effective for a day or two, after which the hole in the radiator re-opens. The mixture of the present invention offers a much more permanent means for stopping leaks, and has actually been demonstrated to retain its effectiveness over a period of more than three months.

A further object of the invention is to provide a mixture of the general character above noted which may be manufactured with comparative economy, which will contain no ingredients harmful, either to the water circulating system or the motor of an engine, and a mixture which will act both quickly and effectively to afford a substantially permanent seal for a leak.

While the particular proportions of the ingredients used are subject to a wide range of variations, and while certain of the ingredients might be replaced by equivalents, I have found that the following formula produces a highly effective mixture, and that in a preferred embodiment of the invention, substantially the proportions listed below are most desirable.

The formula is as follows:
1. 16 ozs. water,
2. 4 ozs. sugar,
3. 2 ozs. flaxseed,
4. 4½ ozs. salt.

The above ingredients are measured by weight. They are thoroughly mixed and put in a linen or cheesecloth bag in which they are soaked in a tub or vat of water for about twenty four hours. At this time the various ingredients with the exception of the flaxseed will have become thoroughly dissolved and the mixture will be ready for canning or bottling. Preferably the mixture is put up in pint cans, and either large or small batches of the solution may be mixed at one time, the proportions being substantially that outlined above.

In some instances I find it desirable to use a dye or other ingredient in connection with the formula. For instance about three fluid drams of caramel dye might be used in order to disguise the exact ingredients of the mixture.

The manner of using the mixture is substantially as follows. If a leak occurs in a radiator, about a pint of the mixture is poured into the radiator while the water is hot. The engine is then run for a few minutes, causing the water to circulate. The engine is shut off. The mixture of the present invention will have been thoroughly distributed through the water circulating system and will crystallize around and seal whatever holes there may be in the radiator.

Referring now more specifically to the functions performed by the various ingredients of the mixture, I may state that the water is used simply to dissolve the other ingredients and retain them in soluble form. The sugar acts as a crystallizing agent and will congeal or crystallize at the openings in the radiator to form a seal. The flaxseed acts as an expanding and clogging agent, plugging up the holes or leak openings so that when the sugar starts to crystallize around the openings, the presence of the flaxseed will cause a crystalline seal to be rapidly built up to cover the whole opening, and the expansion of the flaxseed will greatly facilitate this process.

The salt acts as a hardening agent to render the seal tougher and more permanent.

It is of course to be understood that other crystallizing agents, expanding and clogging agents or hardening agents might be substituted for the sugar, flaxseed or salt, or for any of them, although I find these materials to be the preferred ones for effectively making up the mixture.

Observation of the mixture in action indicates that after it has been circulated in the system, it will ooze out through the holes in the radiator, and tend to form a sticky bed around the holes. Contact with the relatively cold air at the holes will cause the sugar and salt to crystallize, and an effective seal composed of sugar, salt and flaxseed will gradually be built up to completely seal the hole in the radiator. It may be noted that the operation of forming the seal is effected very rapidly.

Obviously various changes might be made in the exact materials used, or in their exact proportions without departing from the spirit and scope of the present invention.

I claim:

1. A leak stopping mixture for automobile radiators consisting of water, sugar, flaxseed and salt in substantially the following proportions—water 16 ozs., sugar 4 ozs., flaxseed 2 ozs., and salt 4½ ozs.

2. A leak stopping mixture for automobile radiators consisting of water, sugar, flaxseed and a hardening agent in substantially the following proportions—water 16 ozs., sugar 4 ozs., flaxseed 2 ozs., hardening agent 4½ ozs.

3. A leak stopping mixture for automobile radiators consisting of water, flaxseed, salt and a crystallizing agent in substantially the following proportions—water 16 ozs., crystallizing agent 4 ozs., flaxseed 2 ozs., salt 4½ ozs.

4. A leak stopping mixture for automobile radiators consisting of water, sugar, an expanding agent and salt in substantially the following proportions—water 16 ozs., sugar 4 ozs., expanding agent 2 ozs., salt 4½ ozs.

JOSEPH D. CAMPANO.